United States Patent
Weisberg et al.

(10) Patent No.: US 10,176,240 B2
(45) Date of Patent: Jan. 8, 2019

(54) METHODS AND SYSTEMS FOR REAL-TIME TRANSACTIONAL DATABASE TRANSFORMATION

(71) Applicant: VoltDB, Inc., Bedford, MA (US)

(72) Inventors: Ariel D. Weisberg, Stoneham, MA (US); Stefano M. Santoro, Winchester, MA (US)

(73) Assignee: VoltDB, Inc., Bedford, MA (US)

( * ) Notice: Subject to any disclaimer, the term of this patent is extended or adjusted under 35 U.S.C. 154(b) by 189 days.

(21) Appl. No.: 14/485,022

(22) Filed: Sep. 12, 2014

(65) Prior Publication Data

US 2015/0074048 A1    Mar. 12, 2015

Related U.S. Application Data

(60) Provisional application No. 61/877,045, filed on Sep. 12, 2013.

(51) Int. Cl.
*G06F 17/30* (2006.01)

(52) U.S. Cl.
CPC .. *G06F 17/30575* (2013.01); *G06F 17/30348* (2013.01)

(58) Field of Classification Search
CPC ................ G06F 17/30575; G06F 17/30348
See application file for complete search history.

(56) References Cited

U.S. PATENT DOCUMENTS

| | | | |
|---|---|---|---|
| 5,875,334 A | 2/1999 | Chow et al. | |
| 5,963,959 A | 10/1999 | Sun et al. | |
| 6,081,801 A | 6/2000 | Cochrane et al. | |
| 6,449,618 B1* | 9/2002 | Blott | G06F 17/30516 |
| 7,155,427 B1* | 12/2006 | Prothia | G06F 17/30595 |
| | | | 707/694 |
| 7,631,293 B2 | 12/2009 | Alcorn | |
| 7,707,174 B2 | 4/2010 | Saito et al. | |
| 7,752,197 B2 | 7/2010 | Dettinger et al. | |
| 7,818,349 B2 | 10/2010 | Frost | |
| 8,225,058 B2 | 7/2012 | Miyamoto et al. | |
| 9,009,203 B2 | 4/2015 | Schreter | |
| 2002/0083067 A1* | 6/2002 | Tamayo | G06F 17/30864 |
| 2002/0103654 A1 | 8/2002 | Poltorak | |
| 2003/0208511 A1* | 11/2003 | Earl | G06F 17/30581 |
| 2005/0198074 A1* | 9/2005 | Khayter | G06F 17/30286 |
| 2006/0224561 A1 | 10/2006 | Bestgen et al. | |
| 2006/0271557 A1 | 11/2006 | Harward et al. | |
| 2012/0011106 A1 | 1/2012 | Reid et al. | |
| 2013/0198139 A1 | 8/2013 | Skidanov et al. | |
| 2013/0198166 A1 | 8/2013 | Prout et al. | |
| 2013/0198231 A1 | 8/2013 | Skidanov et al. | |
| 2013/0198232 A1 | 8/2013 | Shamgunov et al. | |
| 2014/0156586 A1 | 6/2014 | Black et al. | |
| 2014/0244666 A1 | 8/2014 | Elias et al. | |

OTHER PUBLICATIONS

Continuous Analytics over Discontinuous Streams. author: Krishnamurthy et al. ,SIGMOD'10, Jun. 6-10, 2010, Indianapolis, Indiana, USA. Copyright 2010 ACM 978-1-4503-0032-2/10/06, [retrieved on Aug. 25, 2016]. Retrieved from the Internet <URL: https://people.eecs.berkeley.edu/~franklin/Papers/sigmod10krishnamurthy.pdf>.*

* cited by examiner

*Primary Examiner* — Apu M Mofiz
*Assistant Examiner* — Husam Turki Samara
(74) *Attorney, Agent, or Firm* — Goodwin Procter LLP

(57) ABSTRACT

Methods and systems are disclosed for real-time transactional database transformation implemented as part of a real-time transactional database management system.

10 Claims, 3 Drawing Sheets

METHODS AND SYSTEMS FOR REAL-TIME TRANSACTIONAL DATABASE TRANSFORMATION

CROSS REFERENCE TO RELATED APPLICATION

This application claims priority from U.S. Provisional Patent Application No. 61/877,045 filed on Sep. 12, 2013 entitled METHODS AND SYSTEMS FOR REAL-TIME TRANSACTIONAL DATABASE TRANSFORMATION, which is hereby incorporated by reference.

BACKGROUND

The present application relates generally to computer database systems and, more particularly, to methods and systems for real-time transformation of a data feed from a data source for storage in an archival database system.

BRIEF SUMMARY

In accordance with one or more embodiments, a computer-implemented method for real-time transactional database transformation comprises the steps of: (a) receiving, at a real-time transactional database management system, an incoming data feed from a data source; (b) storing the data feed in a source database; (c) performing real-time transaction processing on the data feed using an application that also performs real-time transformation of the data feed in a continuous process into a format suitable for storage in an archival database, without involvement of any external system or process for transforming the data feed; and (d) storing data processed and transformed in step (c) in the archival database.

A database system in accordance with one or more embodiments includes a source database for storing a data feed received from a data source. It also includes a real-time transactional database transformation system that performs real-time transaction processing on the data feed using an application that also performs real-time transformation of the data feed in a continuous process into a format suitable for storage in an archival database, without involvement of any external system or process for transforming the data feed.

DETAILED DESCRIPTION

Many data sources produce a real-time stream of events. A small set of examples of these data feeds includes sensor readings, machine-to-machine communication, World Wide Web user click tracking, and financial market tick data. Processing these data sources in a real-time transactional, durable system is required by many applications. Archiving these data is also required by many applications. The database systems and tools capable of real-time transaction processing against such data feeds are different from the tools capable of long term archival of these feeds' contents.

Connecting the real-time transaction processing systems to the archival systems requires a real-time transactional transformation of the database produced by the data source to a format that is appropriate to a long-term archival system.

Various embodiments disclosed herein are directed to methods and systems for real-time transactional database transformation implemented as part of a real-time transactional database management system.

Figure 1:
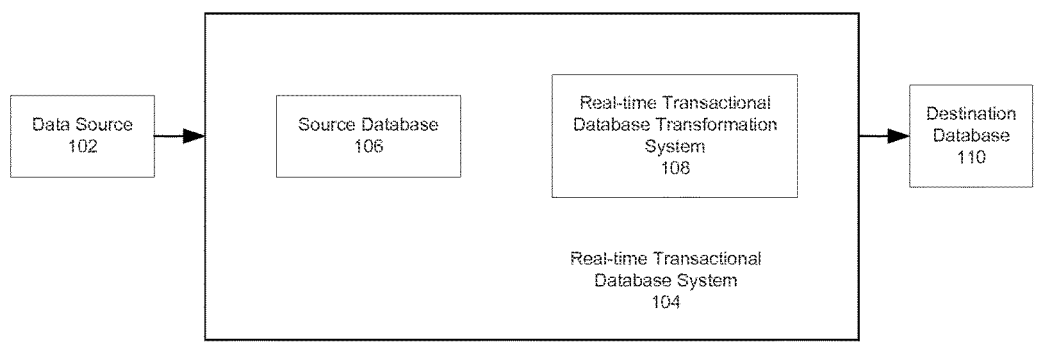
FIG. 1 is a simplified diagram illustrating transformation of data in a real-time transactional database management system for storage in an archival database in accordance with one or more embodiments.

FIG. 1 illustrates a real-time transactional database transformation system in accordance with one or more embodiments. An incoming data feed from a data source 102 is received at a real-time transactional database management system 104 and stored in a source database 106. A real-time transactional database transformation system 108 extracts and loads data from the source database 106 and transforms the data to a format suitable for storage in an archival database 110 without the need for an intermediate third party system. The real-time transactional database management system 104 can comprise a variety of computer systems including, e.g., a single computer, a networked collection of computers, or a collection of virtualized computing units running in a cloud-computing platform.

Real-time transactional database transformation in accordance with one or more embodiments includes one or more of the following attributes:

1. Transformation is only applied to ACID consistent committed transactions.
2. Transformation is in real-time on a per-transaction basis.
3. Extraction of the transformed data from the source database 106 is a continuous real-time process.
4. Extraction of the transformed data from the source database 106 is fault tolerant and highly available after partial failure of the source database 106.
5. Extraction of the transformed data does not require a third party coordinator, but rather is a feature of the source database management system.
6. The transformed data is recoverable and fault tolerant when the remote destination database or historical archive destination is unavailable.
7. The transformed data is recoverable in case of a full/catastrophic failure of the source database.
8. All of these attributes are present on any replica of the source database (e.g., a disaster recovery replica).
9. All of these attributes are present when the real-time transactional database management system 104 is a single computer, or a networked collection of computers, or a collection of virtualized computing units running a cloud-computing platform.

One exemplary implementation of the real-time transactional database management system 104 having these features is described below.

The source database 106 can be transformed by user-provided algorithms containing SQL and other high level code. The result of the transformation (i.e., the content to be passed to the downstream database 110) can be inserted in to an Export table through standard SQL interfaces.

Export tables are SQL relations with user definable attributes. Export tables support transactional inserts—an insert to an Export table COMMITs if the containing transaction COMMITs and ROLLSBACK if the containing transaction executes a ROLLBACK. Only rows in transactions that executed a COMMIT are transferred to the downstream destination database 110. In this way, only REAL-TIME DATABASE content that is in compliance with internal REAL-TIME DATABASE consistency (ACID) checks and external user application logic (business logic constraints) is transformed and communicated to the downstream database 110. Transformation is only applied to ACID consistent committed transactions.

Real-time transactional database transformation involves a continuous extraction of the transformed content to the downstream system. Extraction to a downstream system requires a block of transformed data to be bulk transferred for efficiency and performance. In accordance with one or more embodiments, a combination of two techniques is used to meet this requirement. First, transactions are serially accumulated until an efficient block size is reached for extraction. The extracted block may include a partial transaction, a full transaction, or the results of multiple transactions. The block is filled in real-time and scheduled for extraction once full. While this meets the requirement of continuous extraction in a system that is regularly filling blocks, it does not meet the requirement for systems that partially fill a block and then do not produce further transformations for extraction. Consequently, partially filled blocks are associated with a time-to-accumulate timer. When the timer expires, a block is extracted even if only partially full. Combined, these techniques produce a continuous extraction of content to the downstream system.

Figure 2:
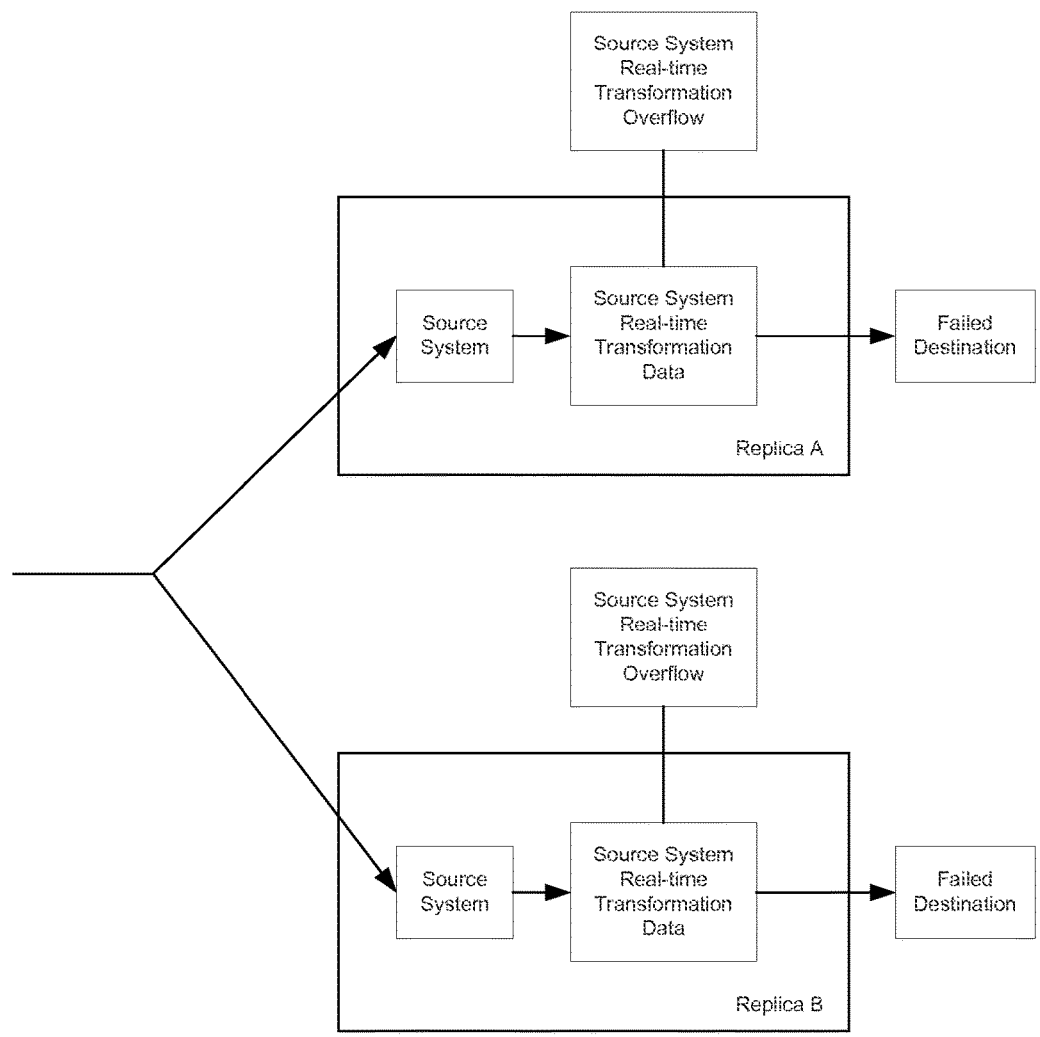
FIG. 2 is a simplified diagram illustrating replication and fault tolerance with overflow in a real-time transactional database management system in accordance with one or more embodiments.

When the source system is a highly available and fault tolerant system that replicates the content of the source database to tolerate partial failure, the transformation should continue when a partial failure occurs. FIG. 2 illustrates an exemplary implementation of this feature. The source system performs the real-time transformation at each fault tolerant replica. Within the system, on a per replica basis, one replica is blessed as the extractor for the transformed source. When extraction is complete, the blessed replica communicates a source transformation truncation point to its peer replicas. If the blessed replica becomes unavailable, the surviving replicas communicate to elect a new blessed extraction replica using a standard distributed leader election algorithm. The new blessed extraction replica continues operation from the previously communicated truncation point. This implementation produces an "at least once" extraction guarantee. All transformed data will be extracted from the source system one or more times even as partial failures occur. To allow downstream systems to tolerate and recognize data that is multiply extracted, each application of the source transformation includes a transaction ID and sequence ID that are promised to be unique in combination. The downstream system can apply a filter to remove duplicate (transaction ID, sequence ID) extractions resulting in a perfect extraction of the transformed source without duplication.

FIG. 2 also details an implementation that does not require a third party extraction or loader process to accomplish. The method of coordinating extraction from a subset of source database servers enables throughput to the downstream system to increase linearly as additional servers are added to the database source system. Additionally, this method avoids any penalty of additional communication between servers in the typical case of fault free processing. The ability to transform, extract, and load data from the real-time source database to the downstream target is an implicit feature of the source database. The transformation of the data may be separated from the extraction and loading of the data to the source system. The extraction and loading may be accomplished by a system of user-extensible plugins that enable a single transformed source to be communicated in specific, different formats to downstream systems. The coordination of hand-off between the transformed source and the downstream system can be optimized by these user-extensible plugins to minimize the communication required between source and destination and to enable optimizations to the recording of the transformation to physical media (both network and storage) while maintaining compliance with all stated requirements.

FIG. 2 also details an implementation that allows arbitrary overflow buffering of the transformed state at the source system in case communication to the downstream target system is temporarily unavailable. The extraction process is resumed by the source system when the target is again detected as available.

Figure 3A:
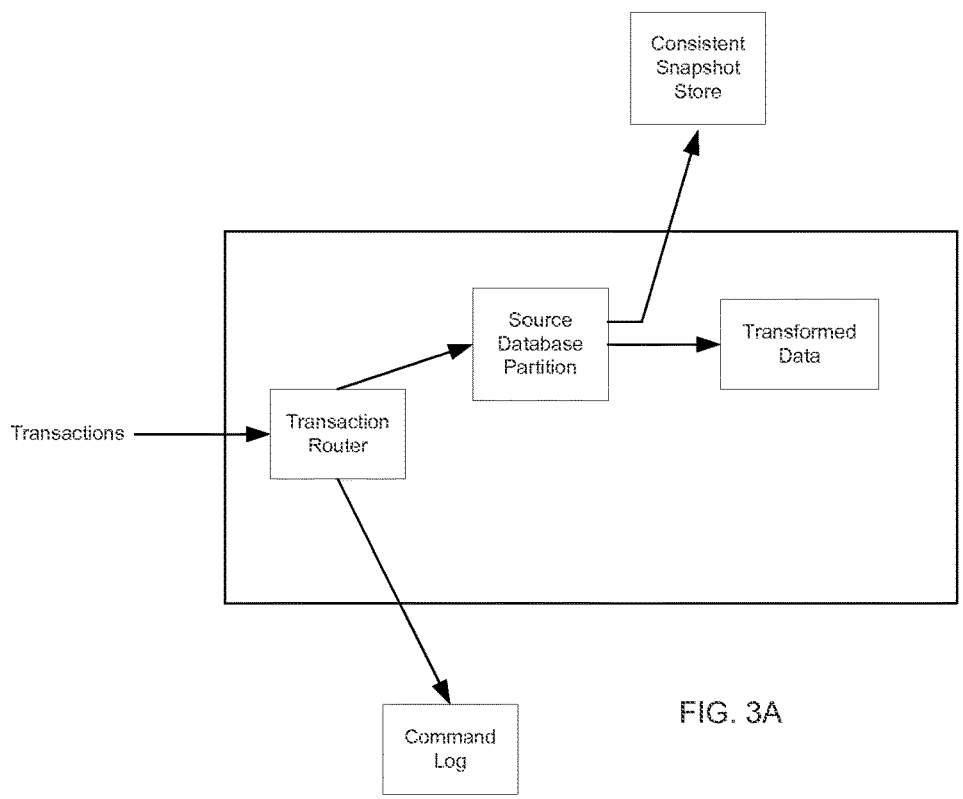
FIGS. 3A and 3B are simplified diagrams illustrating preservation of ACID (Atomicity, Consistency, Isolation, Durability) properties of the transformed database in the face of full failure in accordance with one or more embodiments.
Figure 3B:
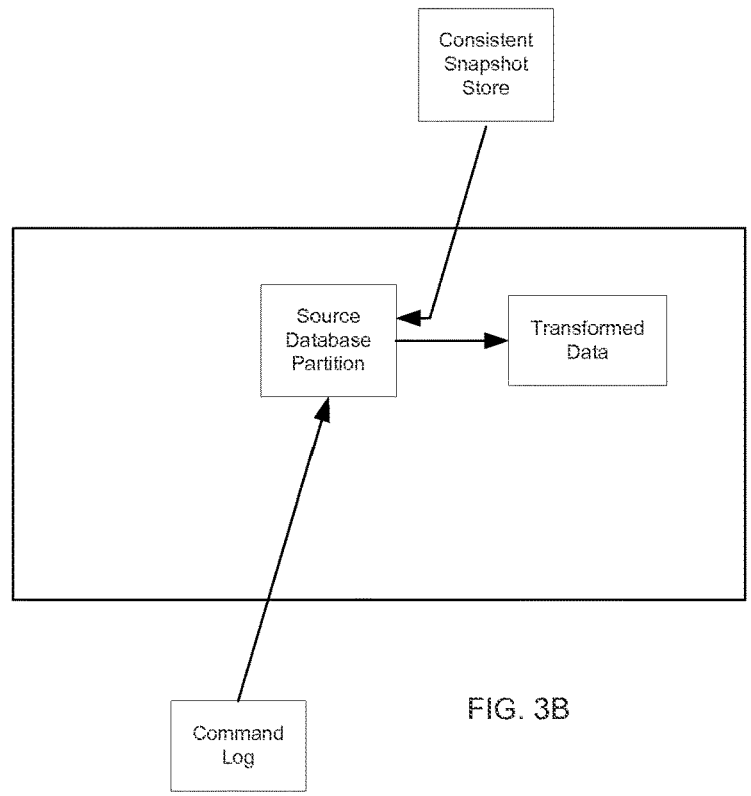

The source system should preserve ACID properties of the transformed database in the face of full failure—failure that exceeds the fault tolerance capabilities of the source system and results in the termination of the source database process. FIGS. 3A-3B illustrates an exemplary implementation of this attribute in accordance with one or more embodiments. The source database system produces periodic ACID compliant snapshots of its state. When a snapshot is originated, the source database system makes durable all transformed, non-extracted data using standard file system and operating system features. Additionally, the source database records the commands that produce the original (non-transformed) database state and records the byte code of the algorithms that produce the transformed data base state. This combination of logical write ahead logging and periodic snapshot allows exported data to be kept in the memory of source database system avoiding the negative performance impact of pessimistically persisting all export data to disk while still meeting the full durability requirement in the case of system failure. To recover from full failure, the source database re-initializes by loading the ACID compliant snapshot and the non-extracted buffers. It truncates the non-extracted buffers to the snapshot's point in time and replays the originating commands and transformation algorithms to recreate the durable state before the full failure.

In this implementation, the combination of the implementation meeting Attribute 4 and Attribute 7 satisfies Attribute 8.

The processes of the real-time data transformation system described above may be implemented in software, hardware, firmware, or any combination thereof. The processes are preferably implemented in one or more computer programs executing on a programmable computer system including a processor, a storage medium readable by the processor (including, e.g., volatile and non-volatile memory and/or storage elements), and input and output devices. Each computer program can be a set of instructions (program code) in a code module resident in the random access memory of the computer system. Until required by the computer system, the set of instructions may be stored in another computer memory (e.g., in a hard disk drive, or in a removable memory such as an optical disk, external hard drive, memory card, or flash drive) or stored on another computer system and downloaded via the Internet or other network.

Having thus described several illustrative embodiments, it is to be appreciated that various alterations, modifications, and improvements will readily occur to those skilled in the art. Such alterations, modifications, and improvements are intended to form a part of this disclosure, and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments.

Additionally, elements and components described herein may be further divided into additional components or joined together to form fewer components for performing the same functions. For example, the computer system may comprise one or more physical machines, or virtual machines running on one or more physical machines. In addition, the computer system may comprise a cluster of computers or numerous distributed computers that are connected by the Internet or another network.

Accordingly, the foregoing description and attached drawings are by way of example only, and are not intended to be limiting.

What is claimed is:

1. A computer-implemented method for real-time transactional database transformation, comprising the steps of:
   (a) receiving, at a real-time transactional database management system, an incoming data feed from a data source, wherein the real-time transactional database management system is configured such that extraction of transformed data from the source database is fault tolerant and available after a failure of the source database;
   (b) storing data from the data feed in a source database comprising a plurality of replicas, wherein the storing comprises storing the data at a first one of the replicas within the source database and storing one or more redundant copies of the data at one or more corresponding others of the replicas within the source database;
   (c) performing real-time transaction processing on the data stored at the first replica within the source database using an application executing within the source database that also performs real-time transformation of the data in a continuous process into a format suitable for storage in an archival database, without involvement of any external system or process for transforming the data;
   (d) performing real-time transaction processing on the one or more redundant copies of the data that are stored at the one or more other replicas within the source database, using an application executing within the source database that also performs real-time transformation of the one or more redundant copies of the data in a continuous process into a format suitable for storage in the archival database, without involvement of any external system or process for transforming the one or more copies of the data,
      wherein the real-time transformation of particular data stored at each replica is performed at such replica following the storing of the particular data at such replica and prior to extraction from the source database;
   (e) designating one of the replicas within the source database as an extractor from the source database of the processed and transformed data stored at the replicas in the source database;
   (f) storing the data processed and transformed by the designated replica within the source database into the archival database by:
      accumulating into a block a portion of a transaction, a complete transaction, and a plurality of complete transactions until a condition occurs comprising either (1) a threshold block size being reached or (2) a timer expiring; and
      extracting the block from the source database by the extractor and storing contents of the block in the archival database,
         wherein the archival database applies a filter to remove duplicate extractions of the processed and transformed data based on unique identifiers previously applied when performing the real-time transformation;
   (g) determining that the replica designated as an extractor is unavailable; and
   (h) designating a different one of the replicas within the source database as a replacement extractor to continue extracting processed and transformed data from the data feed from a truncation point previously communicated by the unavailable replica to other replicas within the source database.

2. The method of claim 1, wherein the real-time transformation of the data stored in the source database is performed in real-time on a per-transaction basis.

3. The method of claim 1, wherein the real-time transactional database management system comprises a single computer, a networked collection of computers, or a collection of virtualized computing units running in a cloud-computing platform.

4. The method of claim 1, wherein data processed and transformed is recoverable and fault tolerant when the archival database is unavailable.

5. The method of claim 4, further comprising providing arbitrary overflow buffering of a transformed state at the source database in case communication with the archival database is temporarily unavailable.

6. A database system, comprising:
   at least one memory for storing computer-executable instructions; and
   at least one processor for executing the instructions stored on the memory, wherein execution of the instructions programs the at least one processor to perform operations comprising:
      (a) receiving, at a real-time transactional database management system, an incoming data feed from a data source, wherein the real-time transactional database management system is configured such that extraction of transformed data from the source database is fault tolerant and available after a failure of the source database;
      (b) storing data from the data feed in a source database comprising a plurality of replicas, wherein the storing comprises storing the data at a first one of the replicas within the source database and storing one or more redundant copies of the data at one or more corresponding others of the replicas within the source database;
      (c) performing real-time transaction processing on the data stored at the first replica within the source database using an application executing within the source database that also performs real-time transformation of the data in a continuous process into a format suitable for storage in an archival database, without involvement of any external system or process for transforming the data;

(d) performing real-time transaction processing on the one or more redundant copies of the data that are stored at the one or more other replicas within the source database, using an application executing within the source database that also performs real-time transformation of the one or more redundant copies of the data in a continuous process into a format suitable for storage in the archival database, without involvement of any external system or process for transforming the one or more copies of the data, wherein the real-time transformation of particular data stored at each replica is performed at such replica following the storing of the particular data at such replica and prior to extraction from the source database;

(e) designating one of the replicas within the source database as an extractor from the source database of the processed and transformed data stored at the replicas in the source database;

(f) storing the data processed and transformed by the designated replica within the source database into the archival database by:

accumulating into a block a portion of a transaction, a complete transaction, and a plurality of complete transactions until a condition occurs comprising either (1) a threshold block size being reached or (2) a timer expiring; and extracting the block from the source database by the extractor and storing contents of the block in the archival database, wherein the archival database applies a filter to remove duplicate extractions of the processed and transformed data based on unique identifiers previously applied when performing the real-time transformation;

(g) determining that the replica designated as an extractor is unavailable; and (h) designating a different one of the replicas within the source database as a replacement extractor to continue extracting processed and transformed data from the data feed from a truncation point previously communicated by the unavailable replica to other replicas within the source database.

7. The system of claim 6, wherein the real-time transformation of the data stored in the source database is performed in real-time on a per-transaction basis.

8. The system of claim 6, wherein the database system comprises a single computer, a networked collection of computers, or a collection of virtualized computing units running in a cloud-computing platform.

9. The system of claim 6, wherein data processed and transformed is recoverable and fault tolerant when the archival database is unavailable.

10. The system of claim 9, wherein the operations further comprise providing arbitrary overflow buffering of a transformed state at the source database in case communication with the archival database is temporarily unavailable.

* * * * *